United States Patent [19]

Trentadue

[11] Patent Number: 4,817,581
[45] Date of Patent: Apr. 4, 1989

[54] ADJUSTABLE SUPPORT FOR CUTTING APPARATUS

[75] Inventor: Frederick Trentadue, Olathe, Kans.

[73] Assignee: Federal-Mogul Corporation, Southfield, Mich.

[21] Appl. No.: 154,269

[22] Filed: Feb. 10, 1988

[51] Int. Cl.$^4$ .............................................. B28D 1/04
[52] U.S. Cl. ........................................ 125/14; 83/486; 83/489; 83/578; 83/581
[58] Field of Search ................ 83/490, 485, 483, 486, 83/487, 488, 489, 581, 471.2, 574, 745; 125/14, 13

[56] References Cited

U.S. PATENT DOCUMENTS

| | | | |
|---|---|---|---|
| 3,289,662 | 12/1966 | Garrison | 125/14 |
| 3,757,628 | 9/1973 | Camacho | 83/745 |
| 4,058,280 | 11/1977 | Clancy | 125/14 X |
| 4,541,404 | 9/1985 | Dols | 125/14 |

Primary Examiner—Donald R. Schran
Attorney, Agent, or Firm—Lawrence J. Shurupoff; Robert F. Hess

[57] ABSTRACT

A cutting tool such as a tile saw is pivotally connected to a linear guide rod with a four-bar linkage. The linkage allows the cutting tool to be raised and lowered over a work table to facilitate plunge cutting. One link of the four-bar linkage is mounted over the linear guide rod in a fixed perpendicular relationship with the surface of the work table to ensure that the blade of the cutting tool is maintained in a similar perpendicular orientation throughout plunge cutting. This is achieved by adjusting the links of the four-bar linkage as a parallelogram linkage. A linear bearing is fitted between the fixed perpendicular link and the guide rod to allow the cutting tool and linkage to freely slide along an accurate linear cutting path.

10 Claims, 7 Drawing Sheets

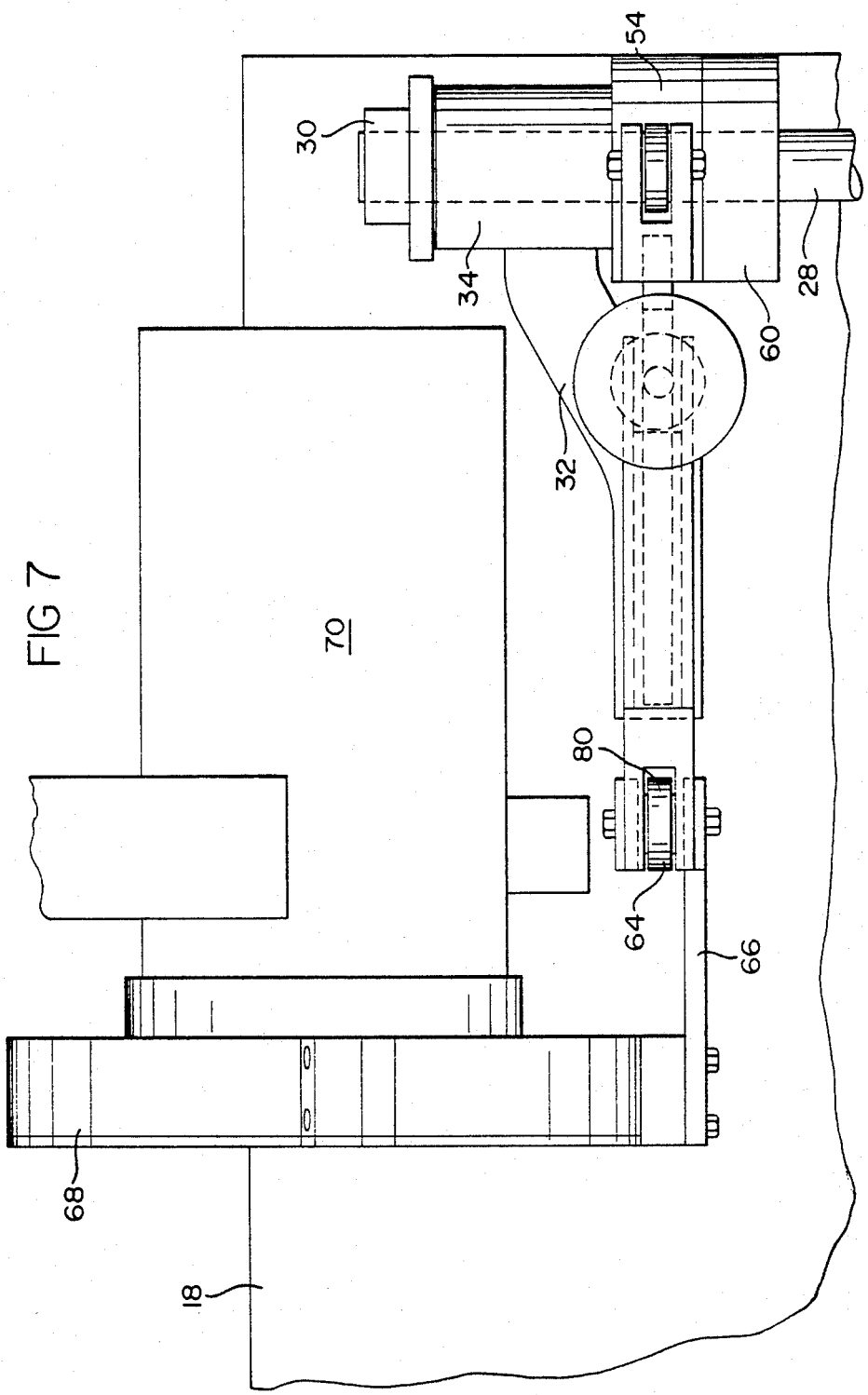

4,817,581

ADJUSTABLE SUPPORT FOR CUTTING APPARATUS

BACKGROUND OF THE INVENTION

1. Field of the Invention

This invention relates generally to an apparatus for adjustably supporting a cutting tool or the like and particularly relates to an adjustable four bar linkage mounted on a linear bearing for supporting a cutting tool.

2. Description of Prior Developments

Assemblies and mechanisms for supporting and/or guiding various cutting tools though their operative movements have been known and used for many years. In the tile and ceramic trades tile cutting tools have frequently used a rotary saw to produce the cuts required to properly size and fit the tiles within a desired pattern. A common design mounted the saw in a fixed position above a cutting table over which a roller carriage would reciprocate. The path of the carriage was fixed by guide rails fixed to the cutting table so that the carriage rollers would follow the fixed track.

In order to cut a tile using such an apparatus it was necessary to align a tile on the carriage and push the carriage along the track beneath the saw so that the tile passed through the path of the rotating saw blade. While this arrangement was suitable for single straight cuts, more complicated cuts required the use of assorted attachments. Moreover, plunge cuts and compound angle cuts were often not possible using prior cutting assemblies.

One approach to making plunge cuts relied upon mounting the saw on the end of a pivotable arm. As the arm rotated about an arc the blade could be plunged into the surface of a tile. This approach produced less than perfect results since the cutting edge of the rotating blade was constrained to define an arcuate cutting path through the tile as the angle of the blade varied from a perpendicular alignment with the tile to a skewed orientation. This resulted in somewhat ragged and curved edges along the plunge cut surface where smooth and flat edges were desired. Moreover, by making an arcuate cut instead of a straight or vertical cut, blade life was decreased due to greater amounts of tile material being cut than in the case of a simple straight cut. Transverse or axial stressing of the blade often accompanied arcuate plunge cutting and resulted in blade damage.

Another drawback associated with prior tile cutting apparatus is the difficulty encountered when producing a compound angle cut. Such a cut would require two separate strokes. That is, one stroke is required for making a cut at a bias to the edge of the tile and a second for cutting a bevel along the edge of the bias cut. This method was generally inconvenient, time consuming and unsuitable for high volume production.

Prior cutting devices have relied upon a heavy cumbersome framework having a relatively complex and cluttered structure for supporting and guiding a cutter blade during cutting operations. Such devices often restricted the ability of the operator to satisfactorily perform cutting operations on large tiles due to interference of the tiles with the framework.

Accordingly, a need has arisen for a lightweight cutting apparatus having a simple, uncluttered design which allows for the simultaneous cutting of bevels and angles in a workpiece during a single operative cutting stroke. A need also exists for a compact inexpensive portable cutting apparatus having an open design which facilitates the cutting of relatively large workpieces. A further need exists for a tile cutting apparatus capable of making a compound angle cut with a single stroke without the use of special attachments. Another need exists for a tile cutter capable of making smooth edged vertical plunge cuts in a simple and convenient manner without applying an axial load to a rotary cutting blade.

SUMMARY OF THE INVENTION

The present invention has been developed to fulfill the needs noted above and therefore has as an object the provision of a framework and linkage for a tile cutting apparatus which embodies a simple lightweight structure which will accommodate relatively large workpieces without interference or obstruction. The apparatus enables a bevel cut to be completed during the same cutting stroke in which an angled cut is made across a workpiece while leaving smooth edges adjacent the cuts.

In order to achieve these objects, a rotary cutting blade is mounted upon a four bar linkage for pivotal movement about a fixed framework. In one setting the four bar linkage is arranged as a parallelogram linkage with one link being fixed in a vertical position perpendicular to a table surface. This ensures the vertical perpendicular alignment of the cutting blade with the workpiece throughout a pivotal cutting stroke.

The pivot point of a blade supporting link is advantageously located at the center of a stationary support shaft to which the cutting blade is pivotally mounted via a bushing and linear bearing assembly. The use of a bushing fitted over a linear bearing not only provides pivotal freedom for the cutting blade but also allows linear translation of the entire linkage and cutter assembly over the support shaft, thereby ensuring an accurate linear cut through the workpiece. Plunge cuts and beveled cuts are also easily achieved with this construction.

BRIEF DESCRIPTION OF THE DRAWINGS

Various other objects, features and advantages of the present invention will become fully appreciated from a review of the drawings, wherein the same reference numerals denote the same or similar parts throughout the several views, wherein:

FIG. 6 is a sectional view taken through the bearing housing, linear bearings and fixed link;

FIG. 7 is a fragmental top plan view of FIG. 2;

DETAILED DESCRIPTION OF THE PREFERRED EMBODIMENT

Figure 1:
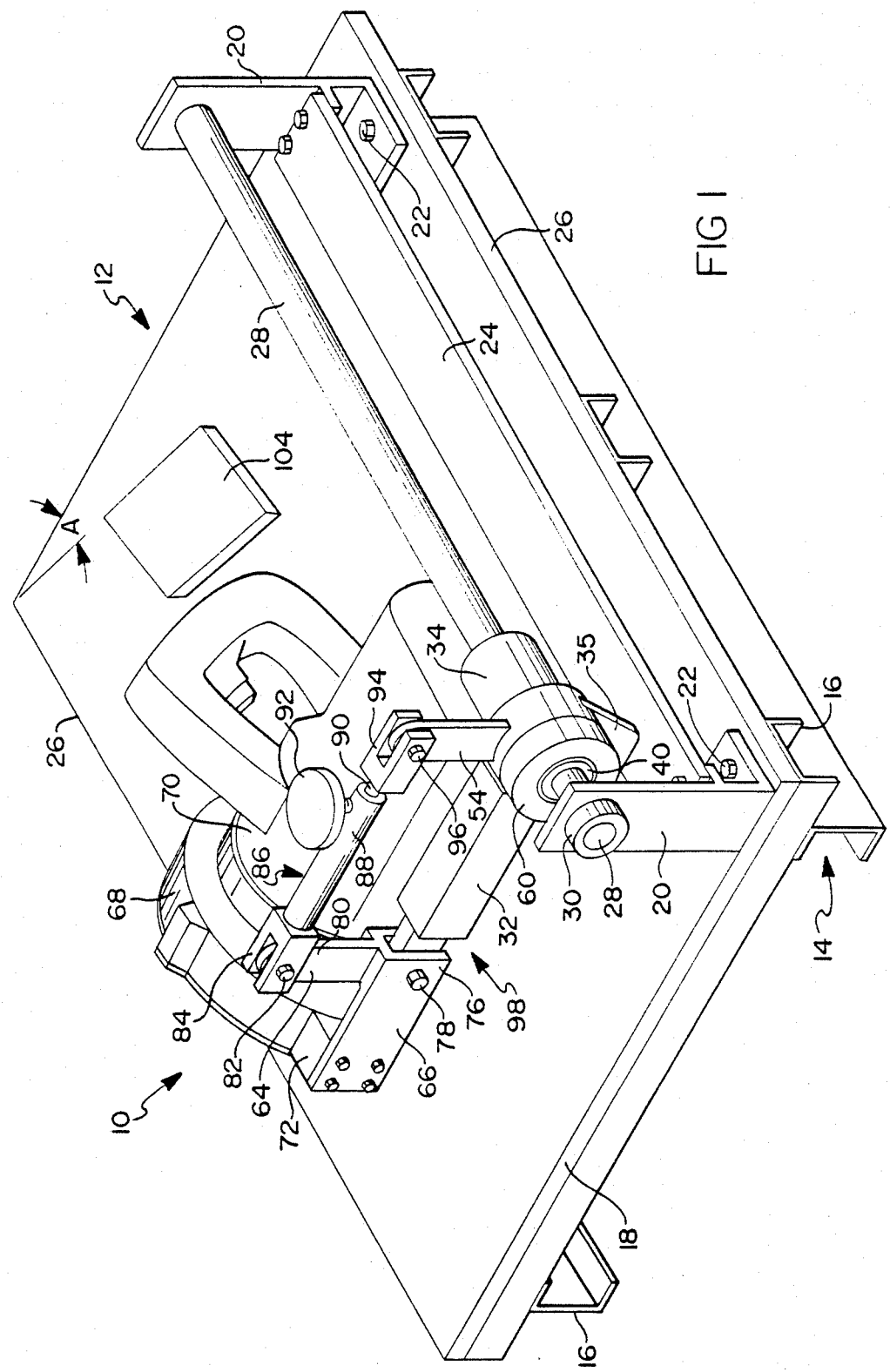
FIG. 1 is a perspective view of a preferred embodiment of the present invention.
Figure 2:
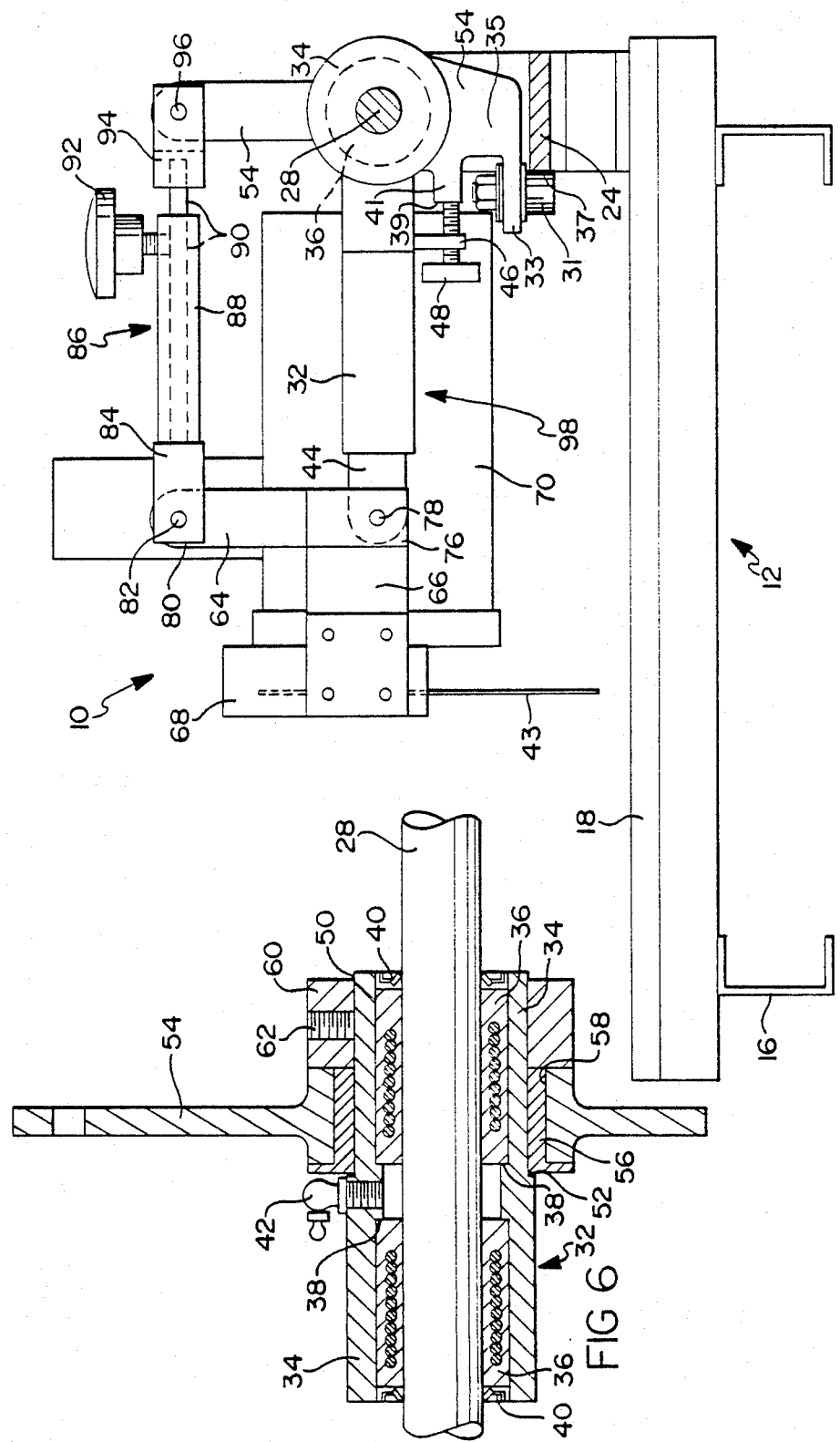
FIG. 2 is a partially sectioned front elevation view of the present invention showing,, the cutting apparatus aligned and set for perpendicular straight edged cutting.
Figure 3:
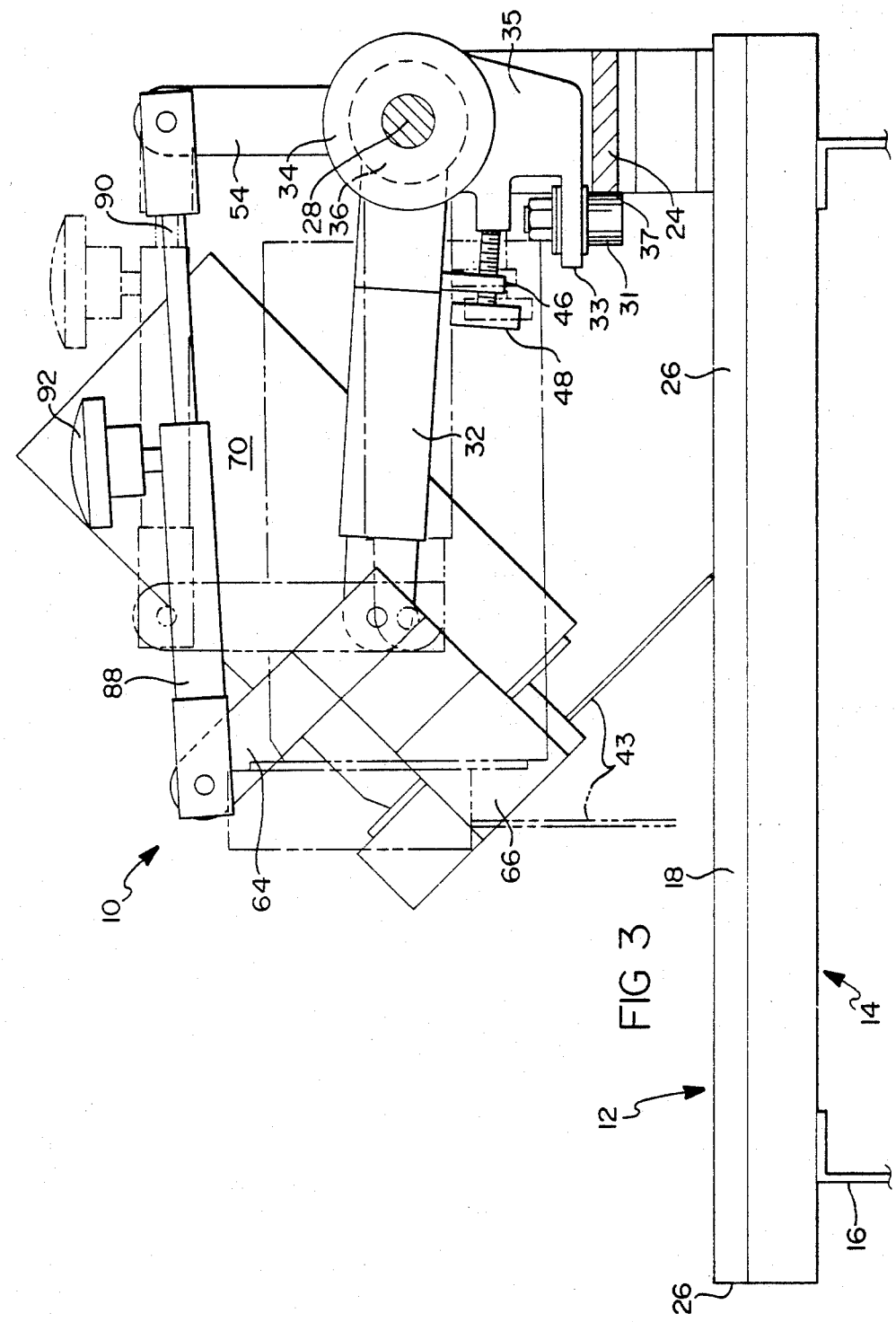
FIG. 3 is a front elevation view of the present invention showing the cutting apparatus aligned and set for biased cutting.

Beginning with FIGS. 1, 2 and 3, a cutting apparatus 10 is shown to include a fixed support table 12 having a low profile base 14 formed from angled beam members 16 interconnected in a bolted or welded construction. A work platform 18 is rigidly fixed to the base 14 with fasteners and/or adhesive. The work platform 18 is preferably rectangular in shape and formed of a plastic material to protect the cutter blades used with the cutting apparatus.

At one side of the table 12 a pair of mounting brackets 20 are secured to the work platform 18 and base 14 with fasteners 22. An anti-rotation guide bar 24 is connected to the support table 12 via the mounting brackets 20. The guide bar 24 is aligned parallel with the surface of the work platform 18 and parallel with the opposed longitudinal edges 26 of the work platform. Also mounted to the brackets 20 is a circular support rod 28. Support rod 28 is mounted directly above the guide bar 24 and is aligned parallel with the guide bar and the surface of work platform 18. The support rod is held and fixed in place with collar members 30.

A pivot support arm 32 is mounted over the support rod 28. One embodiment of the pivot support arm is seen in detail in FIGS. 4 and 5 while a sectional view showing the details of the connection between the pivot support arm and the support rod is shown in FIG. 6. The pivot support arm includes a tubular sleeve portion 34 which provides a housing for a pair of linear bearings 36 (FIG. 6). Although two linear bearings are shown, a single linear bearing or a simple bushing may be used instead.

The tubular sleeve 34 is preferably cast from aluminum and machined with an internal radial step 38 for axially locating and axially spacing the linear bearings therein. Grease or lubricant seals 40 retain the linear bearings within the tubular sleeve 34 A lubricant fitting 42 may be provided on the sleeve 34 for lubricating the linear bearings 36.

Figure 5:
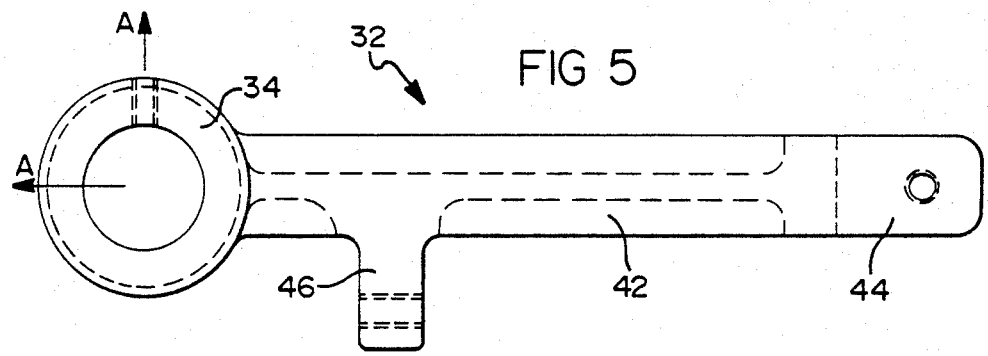
FIG. 5 is a front view of FIG. 4.
Figure 4:
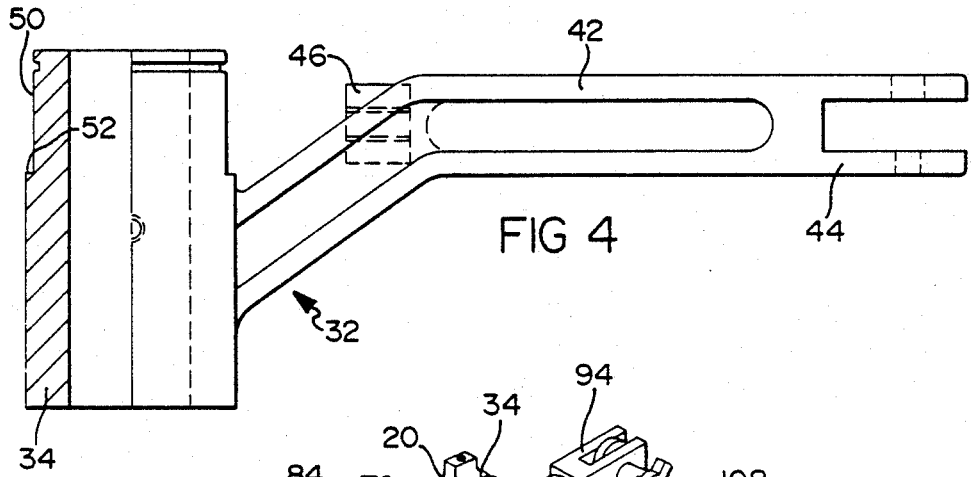
FIG. 4 is an enlarged top view of the pivot support arm and bearing housing partially sectioned along line A—A of FIG. 5.

As seen in FIGS. 4 and 5 the pivot support arm 32 further includes an elbow-shaped link member 42 extending outwardly from the tubular sleeve portion 34 and terminating in a forked end portion 44. A threaded boss 46 is provided on the link member 42 for receiving a threaded adjustable stop rod 48 (FIG. 3), the function of which will be discussed below. The outer surface of the sleeve 34 may be machined to form a cylindrical seat 50 with a radial step 52.

A vertical fixed link 54 is shown in FIGS. 1 and 6 as being mounted over the cylindrical seat 50 of the sleeve 34. A flanged tubular bushing 56, preferably formed of nylon or polytetrafluoroethylene, is loosely fitted within a bore 58 formed in the base of the fixed link 54. The bushing 56 and fixed link 54 are axially located and held in position between the radial step 52 and a set collar 60 which is fixed to the seat 50 with fastener 62. This construction forms a freely pivotable connection between the fixed link 54 and the pivot support arm 32.

The vertical fixed link 54 is aligned perpendicular to the surface of the work platform with a roller 31 (FIGS. 2, 3 and 12) which is rotatably mounted to a flange 33 formed on a lower arm portion 35 of the fixed link 54. The weight of the cutting apparatus fixed to the linkage forces the roller 31 against the inner edge 37 of the guide bar 24 as the roller rolls against the guide bar during a cutting stroke. The roller 31 is mounted on the arm portion 35 in a position which orients the fixed link 54 in a perfectly vertical position at all times.

An abutment surface 39 is formed on boss 41 for limiting the depth of cut of the blade 43 to prevent the blade from cutting deeply into the work platform 18. That is, when the threaded adjustable stop rod 48 contacts the abutment surface 39, the downward motion of the pivot support arm 32 as well as the remainder of the linkage is halted.

In practice, the sleeve 34 of support arm 32 pivots within the bushing 56 and further pivots around the support rod 28. In addition, the pivot support arm 32, the fixed link 54 and all additional elements connected to them via the linkage discussed below are freely linearly movable along the axis of support rod 28. One of these additional elements is a movable vertical link 64.

Figure 9:
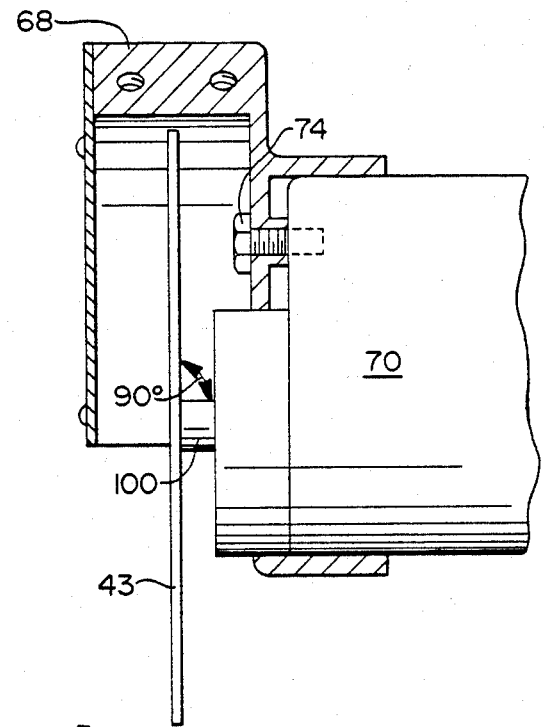
FIG. 9 is a sectional view taken through line B—B of FIG. 7.
Figure 8:
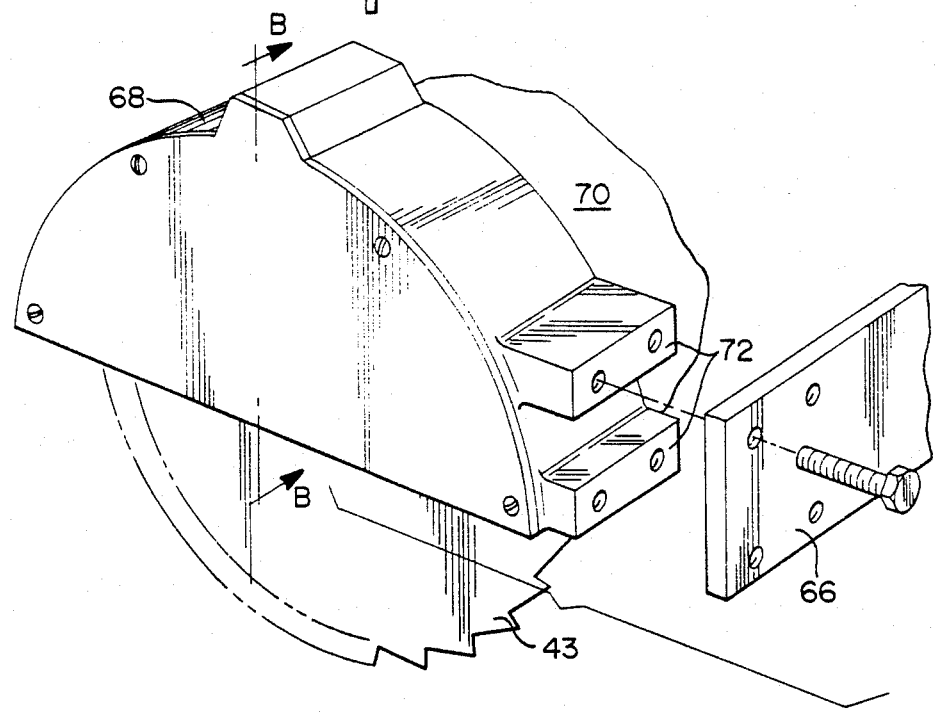
FIG. 8 is a fragmental perspective view of the cutting tool showing its connection to the linkage.

Link 64 is shown in FIGS. 1, 2, 3 and 7 as including an integral mounting flange 66 for rigidly fixing link 64 to the housing 68 of cutter motor 70. As seen in FIG. 8, the housing 68 is formed with tapped mounting bosses 72 for accurately locating the mounting flange 66 on the housing. Housing 68 is in turn rigidly fixed to the motor 70 via threaded fasteners 74 as seen in FIG. 9. One end 76 (FIG. 1) of link 64 is pivotally pinned to the support arm 32 with pin 78 while the opposed end 80 is pivotally pinned at 82 to one forked end 84 of an adjustable link 86.

Adjustable link 86 includes a tubular portion 88 fixed to forked end 84. A rod portion 90 of link 86 is slidably fitted within the tubular portion 88 and is selectively and adjustably fixed in place with set screw 92. The other forked end 94 of adjustable link 86 is pivotally pinned at 96 to the top of fixed link 54.

It can now be appreciated that the vertical fixed link 54, pivot support arm 32, movable vertical link 64 and adjustable link 86 form an adjustable four-bar linkage 98. It is preferable to dimension the distance between pivot pins 78 and 82 equal to the distance between the center of support rod 28 and pivot pin 96. In this manner, linkage 98 is capable of forming a parallelogram linkage. That is, when the distance between pivot pins 82 and 96 is adjusted to be equal to the distance between pivot pin 78 and the center of support rod 28 each opposed pair of links 32,86 and 54,64 are equal in effective length and form a parallelogram between the four pivot points.

When linkage 98 is set up as a parallelogram linkage, a most advantageous result is achieved. That is, linkage 98 may be adjusted in a parallelogram configuration as seen in FIGS. 1 and 2 such that opposed links are always maintained parallel with one another. Since fixed link 54 is preferably vertically oriented in a perpendicular relationship with the surface of the work platform 18, the movable vertical link 64 will also maintain a perpendicular orientation with the surface of work platform 18 as support arm 32 pivots about the center of support rod 28 and as the adjustable link 86 pivots about pivot pin 96.

The mounting flange 66 and mounting bosses 78 are each dimensioned and aligned so that when linkage 98 is set up as a parallelogram linkage, fixed vertical link 54 and movable vertical link 64 will be at all time aligned perpendicular to the axis of motor shaft 100. This alignment results in the vertical perpendicular orientation of cutter blade 43 with respect to the surface of the work platform 18 throughout all pivotal movements of linkage 98 since the blade 43 is mounted perpendicular to the shaft 100.

As seen in FIG. 3, the adjustable link 86 may be set to a length different from the length of the support arm 32, in this case greater than the length of the support arm. This setting allows for bevel cuts. If a workpiece 104 (FIG. 1) is aligned at an angle A with the motor shaft 100, an angled cut may be made. Moreover, if the linkage is set as seen in FIG. 3, a compound cut can be made where an angled and beveled cut is carried out simultaneously.

Figure 12:
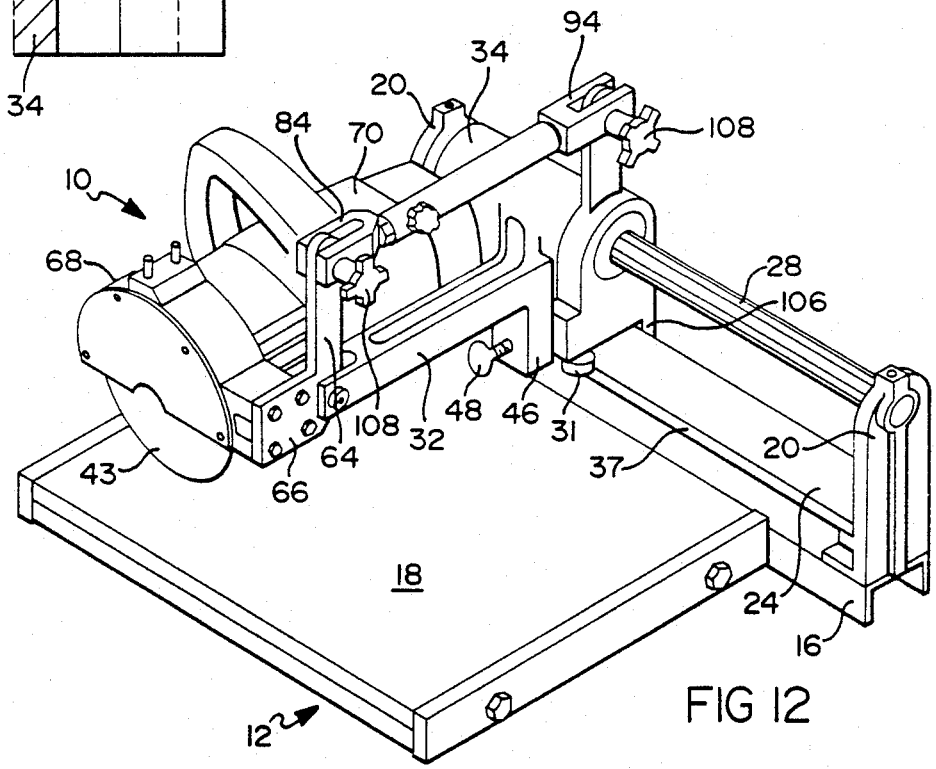
FIG. 12 is a perspective view of an alternate embodiment of the invention which incorporates the fixed link of FIGS. 10 and 11.
Figure 10:
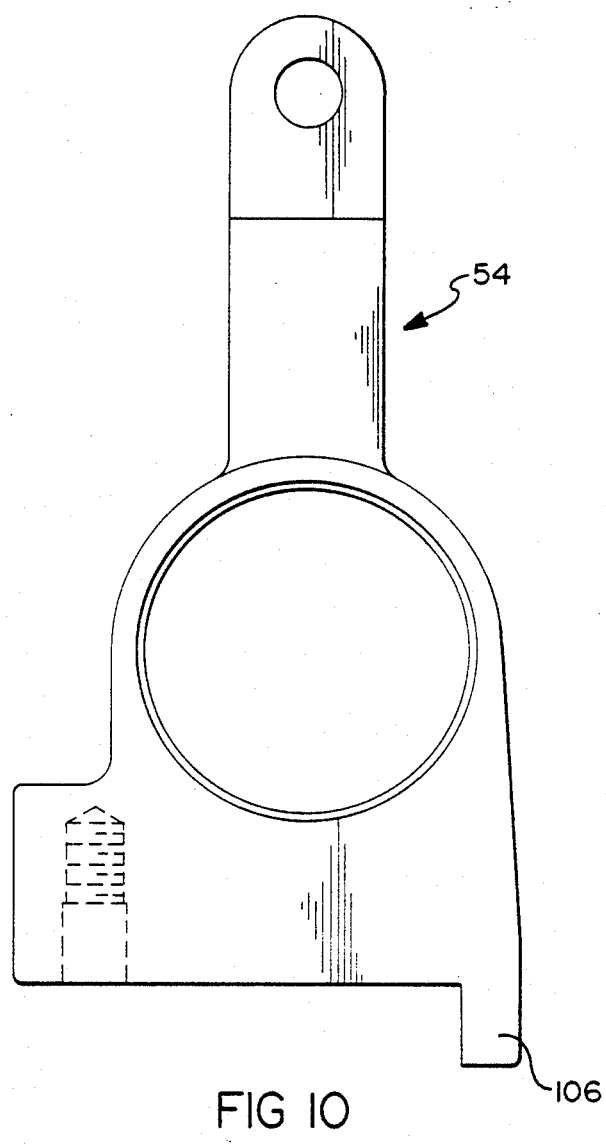
FIG. 10 is a front elevation view of an alternate design of the fixed link.
Figure 11:
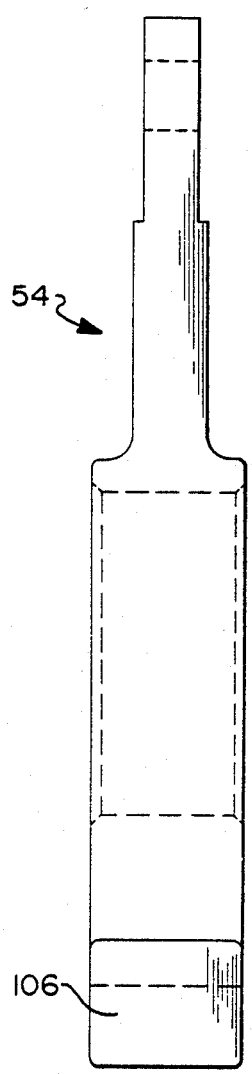
FIG. 11 is a side elevation view of FIG. 10.

A somewhat modified embodiment is shown in FIGS. 10, 11 and 12 wherein the vertical fixed link 54 is formed with a guide flange 106 for more securely anchoring and positively aligning the fixed link 54 with the guide bar 24. The guide flange 106 contacts the outer edge of the guide bar while the roller 31 contacts the inner edge 37 of the guide bar. It can be seen that the embodiment of FIG. 12 includes a simplified support table 12 as well as a guide bar 24 and a support rod 28 which extend beyond the end of table 12. This enables full use of the support table whereby a cut may be completed over its full length, or beyond.

The opposed forked ends 84, 94 of the adjustable link 86 shown in FIG. 10 may be respectively adjustably compressed or clamped against the outer end 80 of link 64 and the top of the vertical fixed link 54 with threaded clamping members 105. This clamping force can vary the resistance to the pivotal movement of linkage 98 to suit the needs of the operator. The clamping members 108 can be tightly torqued to fix the blade 43 at any desired height above platform 18.

Obviously, numerous modifications and variations of the present invention are possible in light of the above teachings. It is therefore to be understood that within the scope of the appended claims, the invention may be practiced otherwise than as specifically described herein.

What is claimed is:

1. An apparatus for guiding a cutting tool through a linear cutting stroke, comprising:
    workpiece support means having a support surface for supporting a workpiece during said cutting stroke;
    linear guide means for accurately guiding said cutting tool through said linear cutting stroke, said linear guide means being operatively associated with said workpiece support means;
    pivot means operatively associated with said linear guide means; and
    linkage means pivotally connected to said pivot means for interconnecting said cutting tool with said linear guide means, said linkage means comprising a first link disposed substantially perpendicular to said support surface of said workpiece support means for maintaining said cutting tool substantially perpendicular to said support surface of said workpiece support means during pivotal movement of said linkage means.

2. The apparatus of claim 1, wherein said linear guide means comprises a linear support rod mounted on said workpiece support means and a linear bearing mounted on said linear support rod.

3. The apparatus of claim 2, wherein said linear support rod is aligned parallel with said support surface of said workpiece support means.

4. The apparatus of claim 2, wherein said first link is mounted on said linear support rod and wherein said linear guide means further comprises anti-rotation means for preventing rotation of said first link about said linear support rod.

5. The apparatus of claim 1, wherein said linkage means further comprises a four-bar linkage having said firs link slidably mounted over said linear guide means.

6. The apparatus of claim wherein said linkage means further comprises a second link pivotally mounted over said linear guide means, said second link serving as a pivot support arm for pivotally connecting said cutting tool with said linear guide means.

7. The apparatus of claim 6, wherein said second link comprises a tubular portion and wherein said linear guide means comprises a linear bearing mounted within said tubular portion.

8. The apparatus of claim 1, wherein said pivot means comprises a bushing mounted between said linear guide means and said first link of said linkage means.

9. The apparatus of claim wherein said linkage means comprises a four-bar linkage having an adjustable length link for adapting said cutting apparatus for beveled cuts or straight cuts.

10. The apparatus of claim 1, wherein said linkage means comprises a parallelogram linkage.

* * * * *